United States Patent
Ritsch et al.

(10) Patent No.: US 10,662,889 B2
(45) Date of Patent: *May 26, 2020

(54) CONTROL METHOD FOR CONTROLLING AN INJECTOR VALVE IN A FUEL INJECTION SYSTEM, AND FUEL INJECTION SYSTEM

(71) Applicant: CPT Group GmbH, Hannover (DE)

(72) Inventors: Tobias Ritsch, Regensburg (DE); Heiko Zabich, Regensburg (DE); Matthias Bauer, Zell (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/898,592

(22) Filed: Feb. 18, 2018

(65) Prior Publication Data
US 2018/0179983 A1    Jun. 28, 2018

Related U.S. Application Data
(63) Continuation of application No. PCT/EP2016/058205, filed on Apr. 14, 2016.

(30) Foreign Application Priority Data
Aug. 18, 2015    (DE) .......................... 10 2015 215 683

(51) Int. Cl.
*F02D 41/22*      (2006.01)
*F02D 41/38*      (2006.01)
(Continued)

(52) U.S. Cl.
CPC ....... *F02D 41/3863* (2013.01); *F02D 41/123* (2013.01); *F02D 41/221* (2013.01);
(Continued)

(58) Field of Classification Search
CPC .. F02D 41/3863; F02D 41/221; F02D 41/123; F02D 41/401; F02D 41/20;
(Continued)

(56) References Cited

U.S. PATENT DOCUMENTS 6,024,064 A       2/2000  Kato et al.
2018/0238260 A1*  8/2018  Seegmuller ........ F02M 63/0245

FOREIGN PATENT DOCUMENTS

DE      19937962 A1     2/2001
DE      102012105818 A1 1/2014
(Continued)

OTHER PUBLICATIONS
International Search Report and Written Opinion dated Aug. 1, 2016 from corresponding International Patent Application No. PCT/EP2016/058205.
(Continued)

*Primary Examiner* — Hai H Huynh

(57) ABSTRACT

The disclosure relates to a control method for controlling at least one injector valve in a fuel injection system of an internal combustion engine. An opening time of the injector valve is selected such that, in a fault situation in the fuel injection system, an opening time of the injector valve is situated in a pressure valley of a pressure oscillation prevailing in a high-pressure region of the fuel injection system.

18 Claims, 7 Drawing Sheets

(51) Int. Cl.
*F02D 41/12* (2006.01)
*F02D 41/40* (2006.01)
*F02M 63/02* (2006.01)
*F02M 55/02* (2006.01)
*F02M 63/00* (2006.01)
*F02D 41/20* (2006.01)

(52) U.S. Cl.
CPC ......... *F02D 41/401* (2013.01); *F02M 55/025* (2013.01); *F02M 63/0245* (2013.01); *F02D 41/20* (2013.01); *F02D 2041/224* (2013.01); *F02D 2200/0602* (2013.01); *F02D 2250/04* (2013.01); *F02M 63/005* (2013.01); *Y02T 10/44* (2013.01)

(58) Field of Classification Search
CPC ......... F02D 2250/04; F02D 2200/0602; F02D 2041/224; F02M 55/025; F02M 63/0245; F02M 63/005; Y02T 10/44
USPC .............. 123/446, 447, 456, 457, 510, 511; 701/107
See application file for complete search history.

(56) References Cited

FOREIGN PATENT DOCUMENTS

| | | |
|---|---|---|
| EP | 2071167 A1 | 6/2009 |
| EP | 2187029 A1 | 5/2010 |
| EP | 2432983 A1 | 3/2012 |
| JP | 2009257277 A | 11/2009 |
| JP | 2009270510 A | 11/2009 |
| JP | 2010116881 A | 5/2010 |
| JP | 2011106414 A | 6/2011 |
| JP | 2011163220 A | 8/2011 |
| JP | 2012229623 A | 11/2012 |
| JP | 20132309 A | 1/2013 |

OTHER PUBLICATIONS

German Office Action dated Mar. 3, 2016 for corresponding German Patent Application No. 10 2015 215 683.4.
Japanese Office Action dated Mar. 28, 2019 for corresponding Japanese patent application No. 2018-508660.
Indian Office Action dated Oct. 14, 2019 for corresponding Indian patent application No. 201817002760.

* cited by examiner

CONTROL METHOD FOR CONTROLLING AN INJECTOR VALVE IN A FUEL INJECTION SYSTEM, AND FUEL INJECTION SYSTEM

CROSS-REFERENCE TO RELATED APPLICATIONS

This application claims the benefit of PCT Application PCT/EP2016/058205, filed Apr. 14, 2016, which claims priority to German Application 10 2015 215 683.4, filed Aug. 18, 2015. The disclosures of the above applications are incorporated herein by reference.

TECHNICAL FIELD

The disclosure relates to a control method with which an injector valve in a fuel injection system of an internal combustion engine can be operated, and to a fuel injection system which is suitable for carrying out the control method.

BACKGROUND

Fuel injection systems, for example gasoline direct injection systems, have, in simplified terms, a high-pressure fuel pump, by means of which a fuel is highly pressurized, and a high-pressure region with a pressure accumulator, the so-called rail, and with at least one injector valve for injecting the highly pressurized fuel into an associated combustion chamber of an internal combustion engine. The stated components are connected to one another by high-pressure lines.

For the operation of the fuel injection system, a control device, the so-called ECU, with corresponding software is normally provided. The control device makes it possible for the delivery power of the high-pressure fuel pump to be adapted. For this purpose, on the high-pressure fuel pump, for example, there is situated a valve, which may be formed for example as a so-called digital inlet valve. The digital inlet valve may for example be provided in a "currentless open" example, that is to say open when electrically deenergized, though other examples are also possible and known. Furthermore, for the regulation of the injection pressure required at the injector valves, a high-pressure sensor is situated in the fuel injection system, which high-pressure sensor is normally attached to the pressure accumulator and serves for acquiring the so-called system pressure. In the case of gasoline as fuel, the system pressure typically lies in a range between 150 bar and 500 bar, and in the case of diesel as fuel, the system pressure typically lies in a range between 1500 bar and 3000 bar. Pressure regulation by acquisition of a signal of the high-pressure sensor, processing of the signal by means of the control device and alteration of the delivery power of the high-pressure fuel pump by means of the digital inlet valve is normally performed. The high-pressure fuel pump is normally mechanically driven by the internal combustion engine itself, for example by means of a camshaft.

In the described high-pressure fuel pumps with a digital inlet valve, faults may arise which lead to an undesirably increased delivery power of the high-pressure fuel pump. This may for example be caused by the inlet valve on the high-pressure fuel pump no longer being able to be fully opened or closed. It is for example also conceivable that, for example as a result of a spring breakage at a spring in the inlet valve, or further possible faults, the delivery power can no longer be controlled.

In such a fault situation, a volume flow for the high-pressure fuel pump is set in a manner dependent on the rotational speed of the internal combustion engine and the temperature prevailing in the fuel injection system. Here, the volume flow may be greater than the injection quantity of the at least one injector valve. For example, in a typical operating state, the so-called overrun mode of the internal combustion engine, no or only little injection is performed through the injector valve. Therefore, if the high-pressure fuel pump delivers an excessively large volume flow, an undesired pressure increase occurs in the fuel injection system.

To be able to deplete undesirably high pressures in the high-pressure region of the fuel injection system, it is common for a mechanical safety valve, a so-called pressure-limiting valve, to be provided on the high-pressure fuel pump, which valve can limit or restrict the pressure.

Typical p-Q characteristics of the pressure-limiting valve are configured such that a maximum pressure takes effect in the pressure accumulator, which maximum pressure exceeds the nominal pressures of the injector valve during normal operation.

After the fault situation, the pressure increases within a few pump strokes of the high-pressure fuel pump up to a maximum pressure, which takes effect in the high-pressure region.

The pressure-limiting valve is commonly designed so as to discharge into a pressure chamber of the high-pressure fuel pump, such that the pressure-limiting valve is hydraulically blocked during a delivery phase of the high-pressure fuel pump. This means that the pressure-limiting valve can open, and discharge fuel out of the high-pressure region, exclusively in the suction phase of the high-pressure fuel pump. Such pressure-limiting valves are referred to as hydraulically blocked pressure-limiting valves.

Due to the structural nature of the injector valve, the injector valve commonly opens counter to the pressure prevailing in the pressure accumulator. Here, in a manner dependent on the operating state of the internal combustion engine, an actuation profile is used for the actuation of the injector valve to open the injector valve such that an injection can begin.

Many injector valves are designed not for the maximum pressure in the fault situation but for normal operation. As such, in fault situations with excessively high pressures in the high-pressure region, the injector valve can no longer open, and the internal combustion engine can thus no longer operate. This can result in a breakdown of a vehicle operated with the internal combustion engine.

SUMMARY

The disclosure provides a control method for controlling an injector valve in a fuel injection system, and a corresponding fuel injection system, where a failure of the internal combustion engine can be prevented even in a fault situation.

One aspect of the disclosure provides a control method for controlling at least one injector valve in a fuel injection system of an internal combustion engine. The fuel injection system has a high-pressure fuel pump with a pump piston which is movable between a bottom dead center and a top dead center in a pressure chamber during operation and which serves for highly pressurizing a fuel, and a high-pressure region for storing the highly pressurized fuel and for supplying the highly pressurized fuel to the at least one injector valve. In addition, a pressure-limiting valve is provided which, when a predefined opening pressure is reached in the high-pressure region, discharges fuel from the high-pressure region into the pressure chamber of the high-pressure fuel pump. A fault situation in the fuel injection system is detected, which lies in the fact that the predefined opening pressure is overshot in the high-pressure region. Furthermore, top dead center (TDC) times at which the pump piston is situated at the top dead center are detected, and from this, a period duration with four evenly distributed quadrants between a first TDC time and a second TDC time is determined. The injector valve is controlled such that the opening time of the injector valve lies in an opening duration which extends into a second quadrant of the period duration and/or into a third quadrant of the period duration.

Implementations of the disclosure may include one or more of the following optional features. In some implementations, the pressure-limiting valve discharges into the pressure chamber of the high-pressure fuel pump, and is therefore blocked in the delivery phase of the high-pressure fuel pump and can open only in the suction phase of the high-pressure fuel pump. Due to this opening characteristic of the pressure-limiting valve, a pressure oscillation occurs in the high-pressure region, which pressure oscillation has pressure peaks and pressure valleys. Here, the pressure peaks correspond to the situation in which the pressure-limiting valve cannot open due to its hydraulic blocking, and the high pressure in the high-pressure region can build up further. Here, the pressure valleys correspond to a suction phase of the high-pressure fuel pump, in which the pressure-limiting valve can open and can discharge fuel into the pressure chamber of the high-pressure fuel pump, whereby fuel and thus pressure is extracted from the high-pressure region, and the pressure there is depleted. The duration between two adjacent pressure peaks that each correspond to the time at which the pump piston moves to the top dead center is a period duration of the pressure oscillation in the high-pressure region. If one defines four quadrants evenly distributed in terms of time in said period duration, the pressure valley is situated exactly at the boundary between a second quadrant and a third quadrant.

The injector valve is designed such that it opens counter to a high pressure in the high-pressure region. If the injector valve seeks to open during a pressure peak, it must open counter to a higher pressure than in a pressure valley. The difference here may for example amount to approximately 50 bar. If the opening time of the injector valve is now shifted such that it is situated in an opening duration that extends in the second quadrant and/or in the third quadrant, the opening time lies in the region of the pressure valley, such that the injector valve has to open counter to a lower pressure than in the region of the pressure peak. It is thereby made possible that the injector valve can continue to open, and the internal combustion engine can continue to be operated, even in a fault situation.

A high-pressure sensor arranged in the high-pressure region detects the fault situation. Such high-pressure sensors are present in any case in the high-pressure region in fuel injection systems, and can therefore be used for signaling a fault situation in the fuel injection system.

The opening pressure of the pressure-limiting valve is set to be lower than a maximum admissible maximum pressure in the high-pressure region. A maximum admissible maximum pressure is to be understood in this case to mean a pressure counter to which the injector valve can still just open. If the opening pressure of the pressure-limiting valve is selected to be considerably lower than the maximum pressure, reliable opening of the injector valve remains possible. The maximum pressure is defined for example in a range above 500 bar. The opening pressure of the pressure-limiting valve may for example lie in a range between 300 bar and 450 bar, and may thus lie considerably above the nominal pressures of the injector valve during normal operation, which lie in a range between 200 bar and 280 bar.

The injector valve may be controlled so as to open only when a fuel demand from the internal combustion engine is present. This means that fuel is injected into combustion chambers of the internal combustion engine only when fuel is actually required.

In some implementations, upon a detection of re-entry into a normal mode of the fuel injection system in which the predefined opening pressure is undershot again in the high-pressure region, the injector valve is controlled such that the opening time of the injector valve lies in any one of the four quadrants. This means that, in the situation in which a normal mode prevails again in the fuel injection system, the injector valve is opened exactly when a fuel demand from the internal combustion engine is actually present, and fuel is actually required. The opening time is not shifted into an expedient region of the pressure oscillation, that is to say there is no time delay between fuel demand and opening time.

For the detection of the TDC times at which the pump piston is situated at the top dead center, a characteristic map may be stored which assigns a predetermined crank angle of the internal combustion engine to the top dead center. Due to the mechanical connection of the high-pressure fuel pump to the internal combustion engine, for example to a crankshaft of the internal combustion engine, the position of the top dead center of the pump piston is known. This may be stored in a characteristic map, such that the period duration can be easily determined from the characteristic map.

For the detection of the TDC times at which the pump piston is situated at the top dead center, a crank angle of the internal combustion engine may be acquired. In this way, an even more reliable determination of the period duration is possible based on the data of the actually present crank angle and of the characteristic map.

In some implementations, at least two operating states of the internal combustion engine are provided. In an overrun mode, no injection of fuel through the injector valve into the combustion chamber takes place. In an injection mode, at least one injection of fuel through the injector valve into the combustion chamber takes place. In the fault situation, the overrun mode of the internal combustion engine is deactivated, such that the internal combustion engine is operated exclusively in the injection mode.

As such, the opening capability of the injector valve can be further assisted, because pressure can be depleted in the high-pressure region in a targeted manner. This is because, in the overrun mode, no pressure can be depleted owing to the absence of extraction of fuel at the injector valve.

Here, it is the case that such a quantity of fuel is injected through the injector valve that a high pressure takes effect in the high-pressure region which is lower than the maximum pressure and which corresponds to an opening pressure of the pressure-limiting valve. In this way, it is possible for the injector valve to be able to be reliably opened counter to the high pressure in the high-pressure region.

Another aspect of the disclosure provides a fuel injection system for injecting fuel into combustion chambers of an internal combustion engine and designed for carrying out the control method described above. Here, the fuel injection system has a high-pressure fuel pump with a pump piston which moves between a bottom dead center and a top dead center in a pressure chamber during operation and which serves for pressurizing a fuel, and a high-pressure region for storing the highly pressurized fuel and for supplying the highly pressurized fuel to at least one injector valve arranged at the high-pressure region. Furthermore, a pressure-limiting valve is provided which is arranged in the high-pressure region and which is designed to, when a predefined opening pressure is reached in the high-pressure region, discharge a fuel from the high-pressure region into the pressure chamber of the high-pressure fuel pump. Furthermore, the fuel injection system includes a control device which is designed to detect a fault situation in the fuel injection system, which lies in the fact that the predefined opening pressure is overshot in the high-pressure region. Furthermore, the control device is designed to detect TDC times at which the pump piston is situated at the top dead center, and to determine a period duration with four evenly distributed quadrants between a first TDC time and a second TDC time. Furthermore, the control device is designed to control the injector valve such that the opening time of the injector valve lies in an opening duration which extends in a second quadrant of the period duration and/or in a third quadrant of the period duration.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
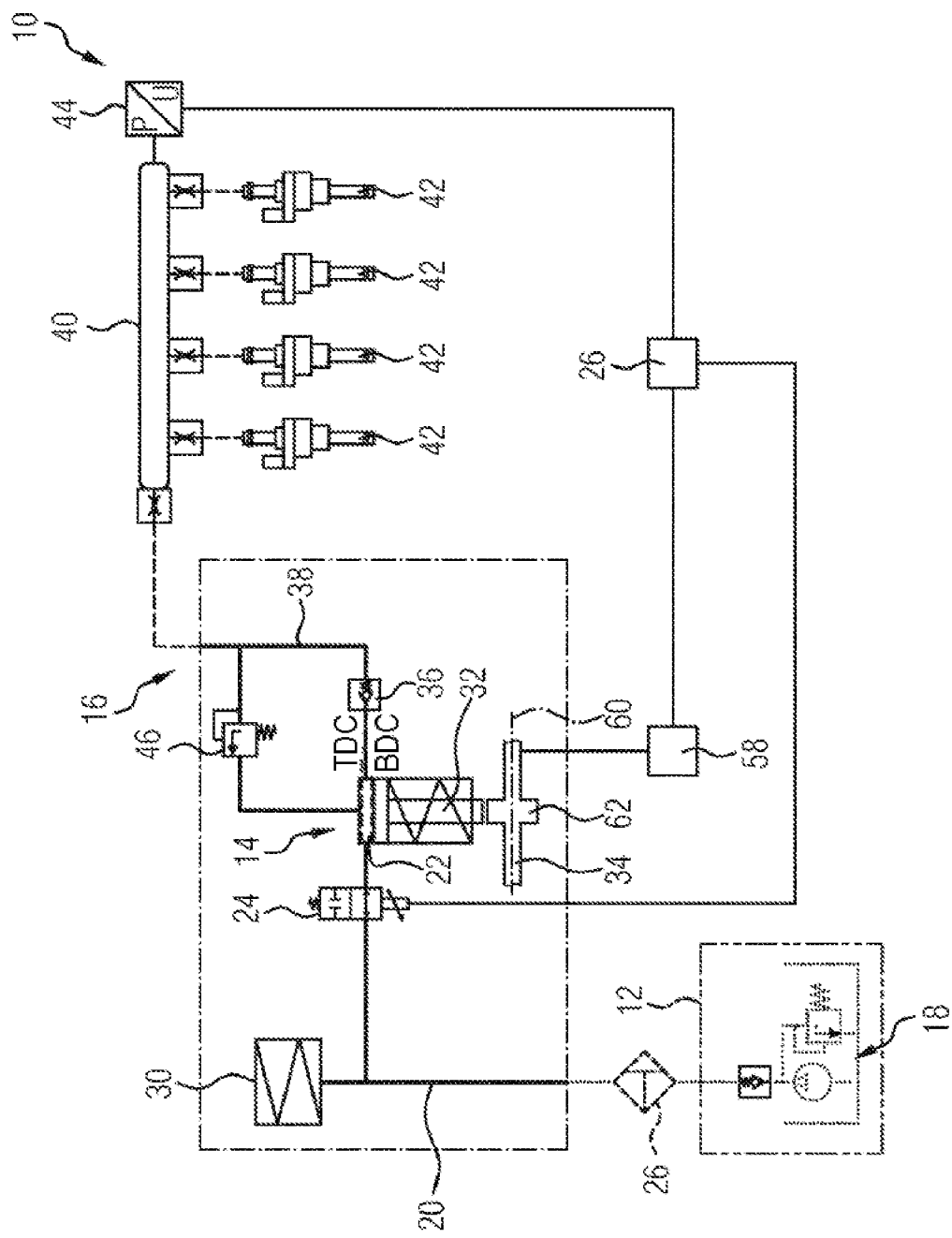
FIG. 1 is a schematic illustration of an exemplary fuel injection system for injecting fuel into combustion chambers of an internal combustion engine.

FIG. 1 shows a fuel injection system 10 whereby fuel can be injected into combustion chambers of an internal combustion engine. For this purpose, the fuel injection system 10 has a fuel accumulator 12 such as for example a tank, a high-pressure fuel pump 14, and a high-pressure region 16 situated downstream of the high-pressure fuel pump 14.

From the fuel accumulator 12, fuel is pumped, for example, by a tank pump 18 into a low-pressure line 20 and is thus delivered to a pressure chamber 22 of the high-pressure fuel pump 14. A digital inlet valve 24 is connected upstream of the pressure chamber 22 in the low-pressure line 20 to regulate a delivery power of the high-pressure fuel pump 14. The digital inlet valve 24 may be actuated by a control device 26 to regulate the fuel quantity that is highly pressurized by the high-pressure fuel pump 14 in the pressure chamber 22. Additional elements such as filters 28 and an evaporator 30 are arranged in the low-pressure line 20 to purify the fuel from the fuel regulator 12 and also dampen pulsation damping actions in the low-pressure line 20.

A pump piston 32 moves in translational fashion back and forth in the pressure chamber 22, and in so doing increases and decreases the volume of the pressure chamber 22. The pump piston 32 is driven in its translational movement by a camshaft 34. Here, the camshaft 34 is coupled for example to a crankshaft of the internal combustion engine and is thus driven by the internal combustion engine itself. During the movement of the pump piston 32 in the pressure chamber 22, the pump piston 32 reaches a top dead center TDC at the moment at which the pressure chamber 22 has its smallest volume, and reaches a bottom dead center BDC at the moment at which the pressure chamber 22 reaches its largest volume. The corresponding times are thus the TDC time and the BDC time.

Highly pressurized fuel is then released via an outlet valve 36 from the high-pressure fuel pump 14 into the high-pressure region 16 and is conducted via a high-pressure line 38 to a pressure accumulator 40, in which the highly pressurized fuel is stored until it is injected via injector valves 42, which are arranged on the pressure accumulator 40, into combustion chambers of an internal combustion engine.

A high-pressure sensor 44 is arranged on the pressure accumulator 40 to regulate the delivery power of the high-pressure fuel pump 14. The high-pressure fuel pump 14 monitors the pressure prevailing in the pressure accumulator 40. The high-pressure sensor 44 transmits a signal to the control device 26, which then actuates the inlet valve 24 in a manner dependent on this signal, such that the high pressure in the pressure accumulator 40 can be regulated.

In some examples, in a fault situation, the high-pressure fuel pump 14 has an increased delivery power, and thus a pressure is generated in the pressure accumulator 40 which is much higher than a normal pressure during normal operation. For this situation, a pressure-limiting valve 46 is provided on the high-pressure line 38, which pressure-limiting valve discharges fuel from the high-pressure region 16 to thereby lower the pressure in the high-pressure region 16. Here, the pressure-limiting valve 46 discharges the fuel into the pressure chamber 22 of the high-pressure fuel pump 14. Since the pressure-limiting valve 46 is normally formed as a check valve, the pressure-limiting valve 46 is hydraulically locked when the high-pressure fuel pump 14 is in the delivery phase, that is to say, when fuel in the pressure chamber 22 is highly pressurized and is then discharged via the outlet valve 36 into the high-pressure region 16. However, if the high-pressure fuel pump 14 is situated in a suction phase, the pump piston 32 moves towards its bottom dead center BDC, the volume in the pressure chamber 22 is expanded, and the pressure-limiting valve 46 can open and discharge fuel into the pressure chamber 22.

Here, an opening pressure $P_{open}$ is set so as to be lower than a maximum admissible maximum pressure $P_{max}$ in the high-pressure region 16 at which it is still just possible for the injector valves 42 to open counter to the high pressure and inject fuel into the combustion chambers. For example, such a maximum pressure Pmax lies above 500 bar. In some examples, the opening pressure Popen of the pressure-limiting valve 46 is thus set in a range between 300 bar and 500 bar. This exceeds the nominal pressures of approximately 250 bar during normal operation, in the case of which the injector valves 42 can be operated without problems.

In a fault situation as described above, for example as a result of a spring breakage at the inlet valve 24 or other fault situations that prevent regulation of the pump delivery power, the high-pressure fuel pump 14 passes into the state of so-called full delivery, and delivers fuel unhindered into the high-pressure region 16. Since the pressure-limiting valve 46 can discharge the fuel into the pressure chamber 22 only during the suction phase of the high-pressure fuel pump 14, the high pressure in the high-pressure region 16 increases within a few pump strokes to a maximum which takes effect.

This will be briefly discussed with reference to the diagram in FIG. 2. Here, the diagram illustrates a pressure-time diagram, where a pressure p in the high-pressure region 16 is plotted versus a time t in which the high-pressure fuel pump 14 performs pump strokes.

Here, the fault situation occurs at a time t1. As can be seen, the pressure p in the high-pressure region 16 increases continuously after this time t1 until the opening pressure Popen of the pressure-limiting valve 46 is reached at a time t2.

Figure 2:
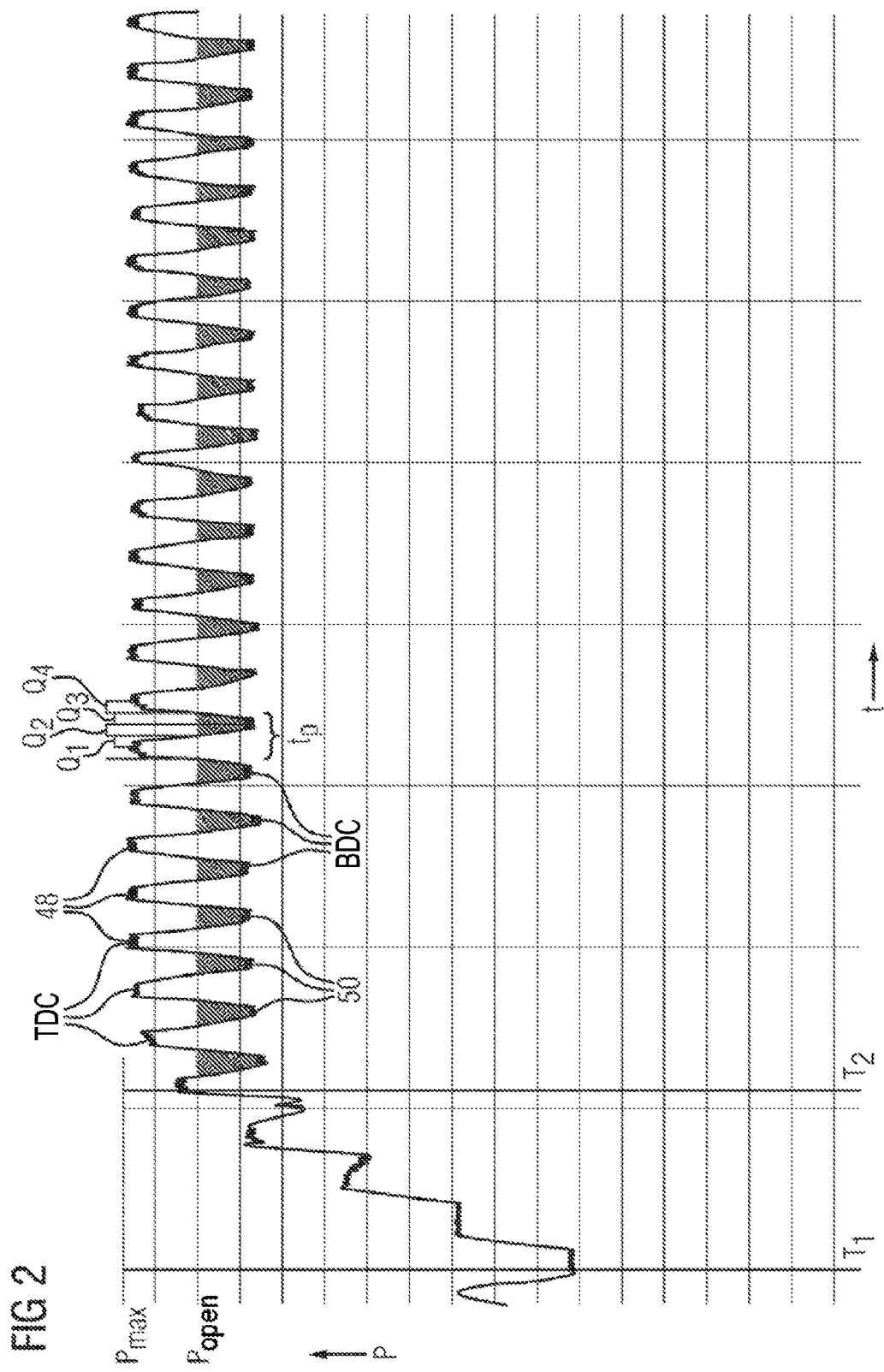
FIG. 2 shows a pressure-time diagram which illustrates a pressure oscillation in a high-pressure region of the fuel injection system from FIG. 1 in a fault situation.

Here, the diagram in FIG. 2 shows the pressure build-up after a fault situation in which the high-pressure fuel pump 14 is set into a full delivery position. The speed with which the opening pressure Popen of the pressure-limiting valve 46 is reached is dependent on the rotational speed of the high-pressure fuel pump 14, which is dependent on a rotational speed of the crankshaft of the internal combustion engine. Furthermore, the pressure increase is also dependent on the temperature in the fuel injection system 10. Here, FIG. 2 illustrates a situation in which the internal combustion engine is in the overrun mode, that is to say in an operating state in which no injection of fuel through the injector valve 42 into the combustion chamber occurs.

Since the pressure-limiting valve 46 can discharge into the pressure chamber 22 only when the pressure in the pressure chamber 22 is lower than the pressure in the high-pressure region 16, a pressure oscillation occurs in the high-pressure region 16, which is distinguished by the fact that, during the discharging of the pressure-limiting valve 46, the high pressure in the high-pressure region 16 falls and then increases again if the pressure-limiting valve 46 is hydraulically blocked. Due to the example of the pressure-limiting valve 46 as a hydraulically blocked pressure-limiting valve, the characteristic shown in FIG. 2 is thus realized, with pressure peaks 48 when the high-pressure fuel pump 14 is in the delivery phase and with pressure valleys 50 when the high-pressure fuel pump 14 is in the suction phase.

If a fault situation arises which leads to overdelivery or full delivery of the high-pressure fuel pump 14, the maximum pressure in the pressure accumulator 40 increases, for example, in the overrun mode or in operating states with a low injection quantity, in a manner dependent on the present rotational speed of the internal combustion engine and the temperature in the fuel injection system 10. In the case of pressures higher than the maximum admissible injector opening pressure Pmax, misfiring of the internal combustion engine or even a breakdown of a vehicle operated with the internal combustion engine can occur.

To prevent the pressure that prevails at the injector valves 42 from increasing beyond the maximum pressure Pmax at which the injector valves 42 still open, the methods described below may be carried out. Below, three different methods will be described, which may be implemented as countermeasures; the methods may be implemented in each case individually or in combination. The control device 26 is in each case designed to carry out each of the methods. If the methods are carried out simultaneously, the control device 26 is configured correspondingly.

Below, however, for the sake of clarity, the methods will be described only as methods to be carried out individually.

A first countermeasure with which a shutdown of the internal combustion engine may be prevented is in this case a so-called overrun deactivation, which will be described below with reference to FIG. 3 and FIG. 4.

Figure 3:
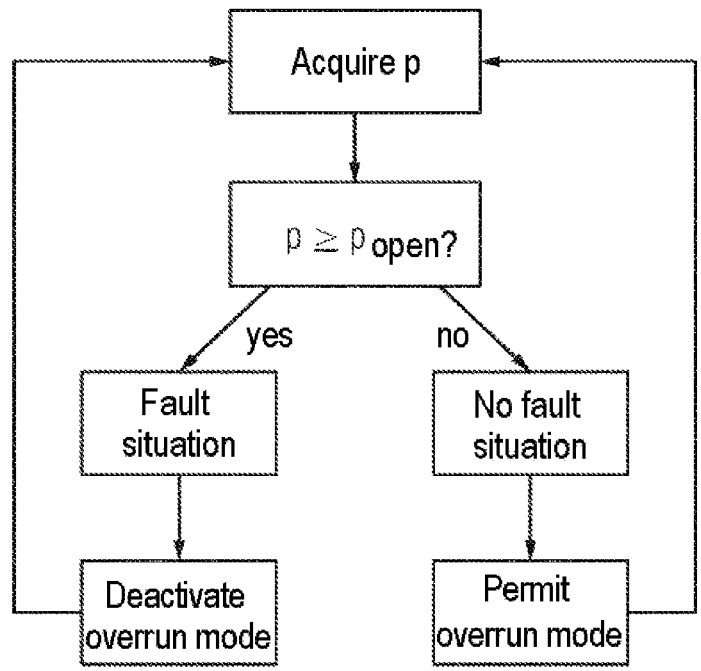
FIG. 3 shows a flow diagram which schematically illustrates an operating method for operating the fuel injection system from FIG. 1 in the fault situation, in a first example.
Figure 4:
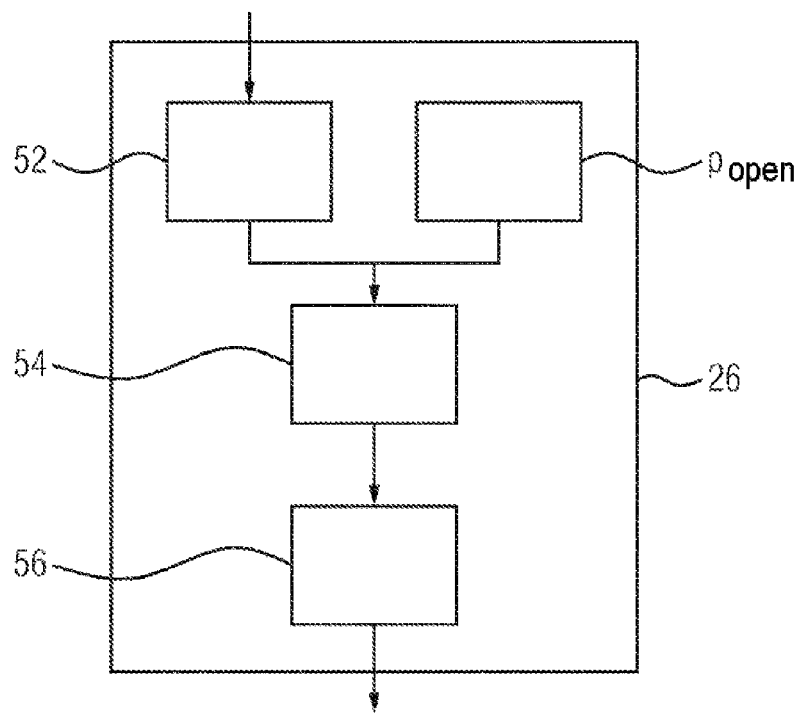
FIG. 4 is a schematic illustration of a control device which is designed for carrying out the operating method as per FIG. 3.

Here, FIG. 3 schematically shows, based on a flow diagram, the steps of an operating method with which such overrun deactivation can be implemented, whereas FIG. 4 schematically shows the control device 26 that is configured for carrying out the operating method as per FIG. 3.

The internal combustion engine is operated by the control device 26 in at least two operating states, specifically in an overrun mode and in an injection mode. Here, in the overrun mode, no fuel is injected via the injector valves 42 into the combustion chambers of the internal combustion engine, whereas, in the injection mode, at least one injection of fuel through the injector valves 42 into the combustion chambers occurs.

In the operating method, in a first step, a pressure p in the high-pressure region 16 is firstly acquired by the high-pressure sensor 44. For this purpose, the control device 26 has a pressure acquisition device 52, which communicates with the high-pressure sensor 44. The opening pressure Popen of the pressure-limiting valve 46 is also stored in the control device 26.

In a subsequent step of the operating method, a fault detection device 54 of the control device 26 determined whether the pressure p is higher than or equal to the opening pressure Popen of the pressure-limiting valve 46. If this is the case, the fault detection device 54 detects that a fault situation is present. In this case, by an overrun deactivation device 56 in the control device 26 deactivates the overrun mode of the internal combustion engine. This means that an overrun deactivation of the injector valves 42, such that they inject no further fuel into the internal combustion engine, is prohibited, and only fired overrun, that is to say the injection mode of the internal combustion engine, is permitted by the control device 26. It is thereby ensured that always a certain fuel quantity is discharged via the injector valves 42 and thus extracted from the high-pressure region 16. The pressure level in the high-pressure region 16 is in this case kept below the critical pressure Pmax for the injector opening, and may be even lowered to such an extent as to lie in the range of the opening pressure Popen of the pressure-limiting valve 46.

After detection of the fault situation that leads to the uncontrolled delivery by the high-pressure fuel pump 14, therefore, the overrun mode, in which no fuel is injected, is prohibited, and instead, only an operating state with an at least small injection quantity is permitted and also implemented. The corresponding function is in this case stored in the control device 26.

If it is however identified in the operating method that the pressure p in the high-pressure region 16 is not greater than or equal to the opening pressure Popen of the pressure-limiting valve 46, the fault detection device 54 identifies that no fault situation is present, and the overrun mode of the internal combustion engine remains permitted. Both after permission of the overrun mode and after deactivation of the overrun mode, it is always the case that the pressure p in the high-pressure region 16 is acquired again and it is checked whether the pressure is higher than or equal to the opening pressure Popen of the pressure-limiting valve 46.

If the situation arises in which, after deactivation of the overrun mode, the pressure p in the high-pressure region 16 has fallen below the opening pressure Popen, the fault detection device 54 detects that the fuel injection system 10 has entered a normal mode again. In this case, the overrun mode may then be reactivated. This means that the functionality can be optionally withdrawn again in a manner dependent on the pressure conditions in the fuel injection system 10.

Altogether, the risk of a breakdown of a vehicle operated with the internal combustion engine is reduced by the operating method. Here, the fault situation is not relevant to the exhaust gas. A possible power loss is acceptable in the fault situation.

An actuation method for actuating the fuel injection system 10, which may be carried out alternatively or in addition to the overrun deactivation described above, will be described below with reference to FIG. 5 and FIG. 6. Here, a camshaft angle of the camshaft 34 relative to the pump piston 32 is adjusted in targeted fashion by a camshaft adjuster 58 provided in the fuel injection system 10.

The camshaft 34 rotates about a camshaft axis 60, where, at regular intervals, a cam 52 comes into contact with the pump piston 32 such that the pump piston 32 is moved toward the top dead center TDC. As the camshaft 34 rotates onward, the cam 62 moves away from the pump piston 32 again, and the pump piston 32 moves in the direction of the bottom dead center BDC. Therefore, in periodic intervals, the pump piston 32, moved by the cam 62, is situated alternately at the top dead center TDC and at the bottom dead center BDC. However, if an angle between pump piston 32 and the camshaft 34 is adjusted during the operation of the camshaft 34, the spacing between two successive top dead centers TDC is no longer uniform, as illustrated for example in the diagram shown in FIG. 2, it rather being the case that the TDC time of the top dead center TDC changes.

The adjustment of the angle of the camshaft 34 may likewise be induced by means of the control device 26, by means of a cam angle adjustment device 64 arranged in the control device 26.

If an injection time t1 at which the injector valves 42 begin the injection of fuel into the combustion chambers is known, for example by virtue of an opening time topen for the injector valves 42 being set by an opening time setting device 66 in the control device 26, the camshaft 34 can be adjusted by means of the camshaft angle adjustment device 64 such that the injection time tI is situated in the pressure valley shown in FIG. 2.

Figure 5:
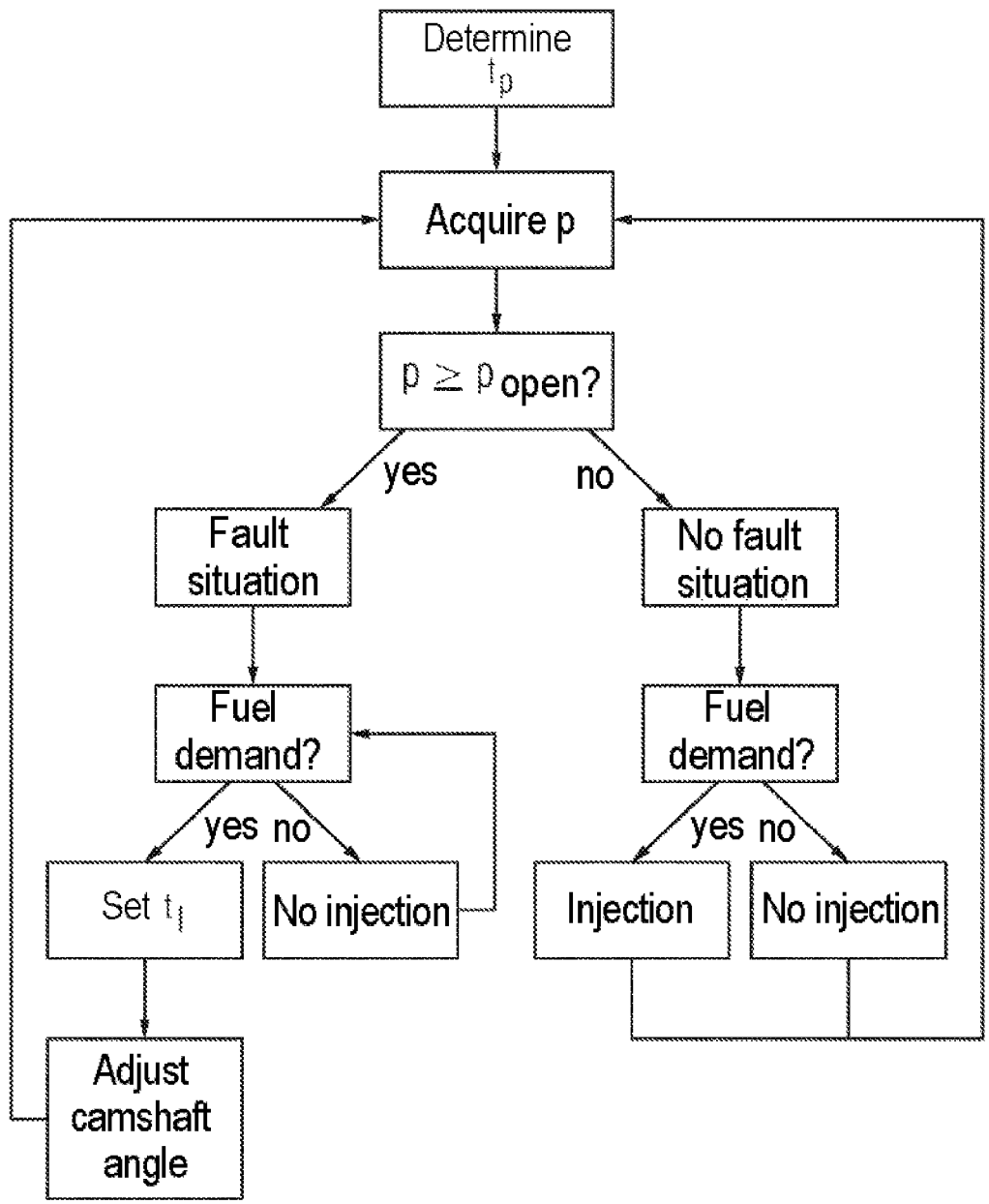
FIG. 5 shows a flow diagram which schematically illustrates an actuation method for the actuation of the fuel injection system from FIG. 1 in a fault situation, in a second example.
Figure 6:
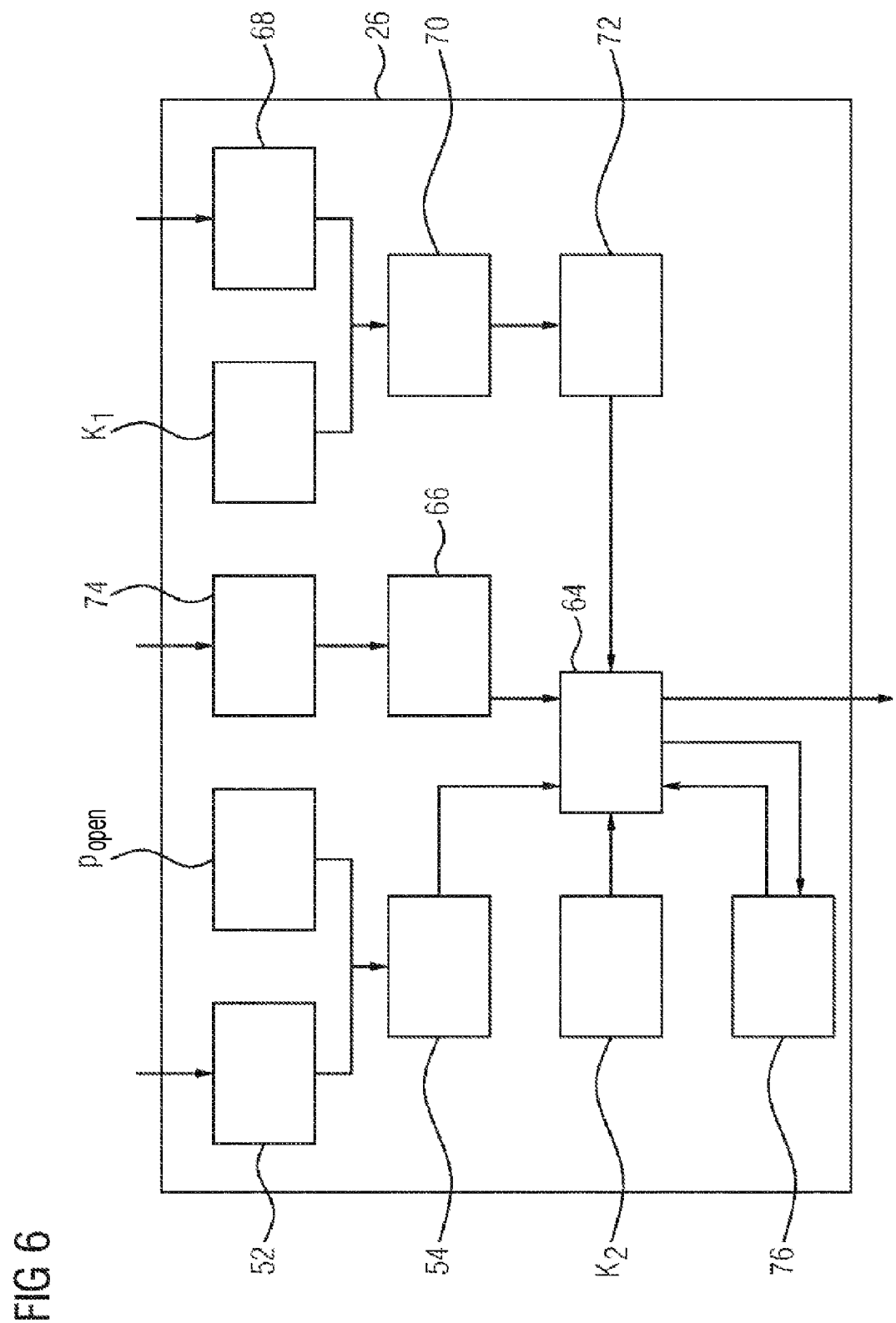
FIG. 6 is a schematic illustration of a control device which is designed for carrying out the actuation method as per FIG. 5.

For this purpose, as per the flow diagram in FIG. 5, it is firstly the case that a period duration tp of the pressure oscillation in the high-pressure region 16 is determined. Here, the period duration tp corresponds to a duration between the time at which the pump piston 32 reaches a first top dead center TDC and a time at which the pump piston 32 next reaches a top dead center. Due to the mechanical connection of the high-pressure fuel pump 14 to the internal combustion engine, the position of the camshaft 34 and thus of the top dead center TDC of the pump piston 32 are known and are stored in a first characteristic map K1 in the control device 26, where the characteristic map K1 assigns every crankshaft angle a position of the pump piston 32. Also arranged in the control device 26 is a crank angle acquisition device 68 that the control device 26 uses to acquire the present crankshaft angle. A TDC detection device 70 can detect when the pump piston 32 is situated at a top dead center TDC from the data of the first characteristic map K1 and the data of the crankshaft acquisition device 68. This information is fed to an evaluation device 72 which is arranged in the control device 26 and which, from the information, determines the period duration tp. Furthermore, the evaluation device 72 divides the period duration TP into four evenly distributed quadrants Q1, Q2, Q3 and Q4.

In the actuation method, it is subsequently, analogously to the overrun deactivation, identified whether a fault situation is present in the fuel injection system 10.

If a fault situation is present, there is firstly a waiting period until a fuel demand detection device 74 detects whether a fuel demand from the internal combustion engine is present, that is to say whether an injection via the injector valves 42 is required. If this is the case, the injection time t1 is firstly set to an arbitrary time. Then, the camshaft adjuster 58, which is driven by the camshaft angle adjustment device 64, adjusts an angle of the camshaft 34 relative to the pump piston 32 such that the previously set injection time t1 falls into the pressure valley of the pressure oscillation from FIG. 2, that is to say into the duration of the second quadrant Q2 or of the third quadrant Q3.

However, if no fuel demand is present, no injection via the injector valves 42 is performed.

To be able to adjust the camshaft angle in targeted fashion, a second characteristic map K2 is stored in the control device 26, which second characteristic map assigns every camshaft angle of the camshaft 34 relative to the pump piston 32 a predetermined time at which the pump piston 32 is situated at the top dead center TDC. Also arranged in the control device 26 is a memory device 76 that stores the present camshaft angle. The data of the characteristic map K2 and of the memory device 76 are fed to the camshaft angle adjustment device 64, so that the camshaft angle can be adjusted in targeted way. Furthermore, the camshaft angle adjustment device 64 outputs a signal to the camshaft adjuster 58 only if the information regarding when the injection through the injector valves 42 is supposed to start is present, that is to say when the injection time t1 has been set. The camshaft adjuster 58 adjusts the angle of the camshaft 34 only when a fault situation is actually present, where the camshaft angle adjustment device 64 is additionally fed with the information from the evaluation device 72 as regards where the pressure valley 50 is presently situated.

If the fault detection device 54 identifies that no fault situation is present, and if the fuel demand detection device 74 detects that fuel is demanded by the internal combustion engine, fuel is injected entirely normally via the injector valves 42 into the respective combustion chambers. In the absence of a fuel demand, however, the injector valves 42 do not open.

The method in which the camshaft angle is adjusted in order to thereby shift the injection time t1 into a pressure valley 50 is also carried out continuously in order to thereby detect whether the fuel injection system 10 has entered a normal mode and the pressure p in the high-pressure region 16 lies below the opening pressure Popen again. In this case, the adjustment of the camshaft 34 is ended in a manner dependent on the set injection time t1.

Therefore, if the high-pressure fuel pump 14 is mechanically driven by a camshaft 34 which exhibits a means for adjusting the angle, that is to say a so-called camshaft adjuster 58, which may be hydraulically or electrically operated, then in the event of a fault situation being detected, the camshaft 34 is adjusted by the camshaft adjuster 58 such that the start of injection, that is to say the injection time t1, falls into the negative amplitude, that is to say into the pressure valley 50, of the rail pressure oscillation as per FIG. 2. Therefore, the injector valves 42 can still open even if the averaged pressure in the pressure accumulator 40 lies above the pressure Pmax critical for the injector opening. Therefore, a functionality is proposed by which an adjustment of the camshaft 34 by the camshaft adjuster 58 is possible, such that the start of injection of the injector valves 42 is relocated into regions expedient with regard to pressure, specifically the pressure valleys 50. This function is also stored in the control device 26, and the functionality may optionally be withdrawn again in a manner dependent on the pressure conditions in the fuel injection system 10.

Figure 7:
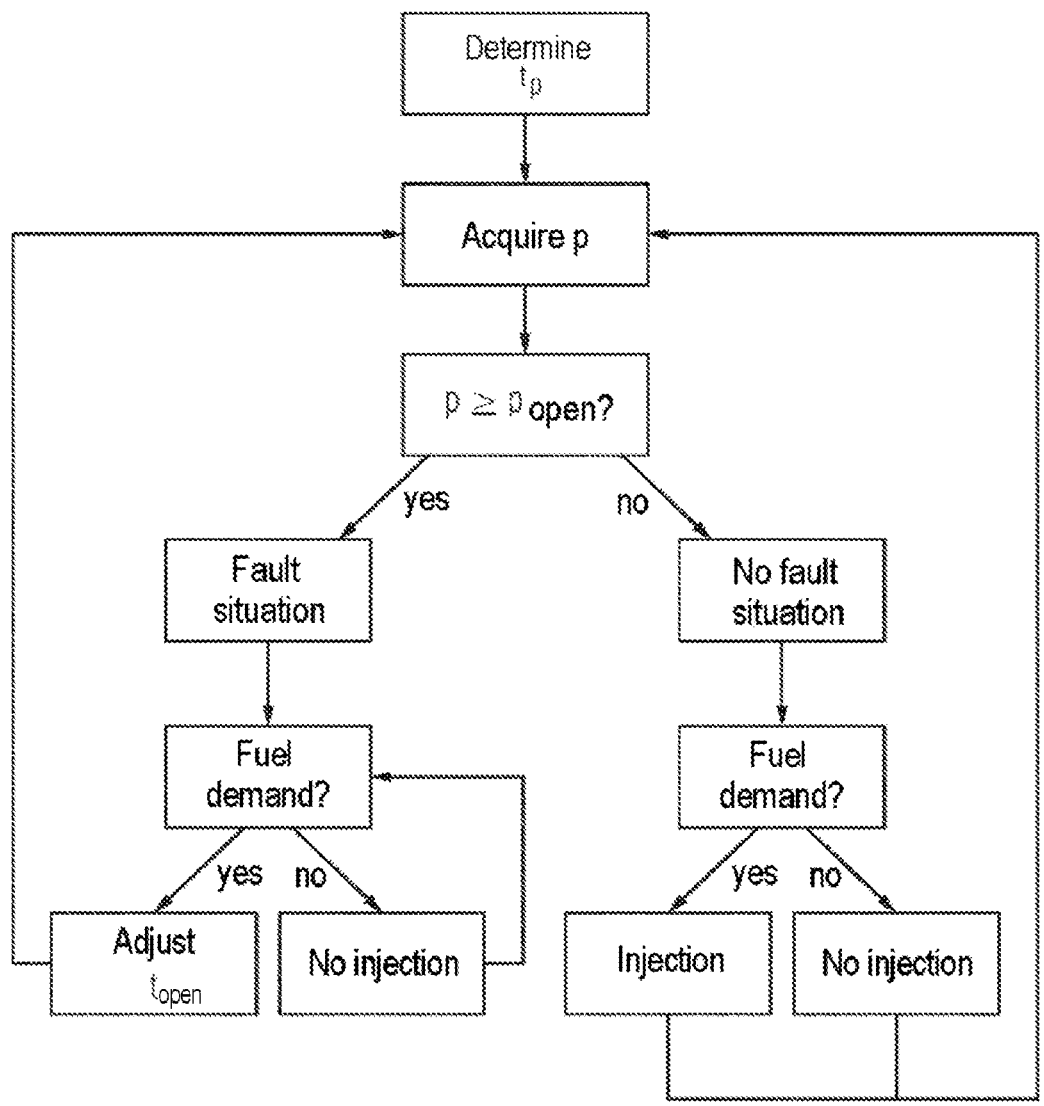
FIG. 7 shows a flow diagram which schematically illustrates an actuation method for the actuation of an injector valve of the fuel injection system from FIG. 1 in a fault situation of the fuel injection system.
Figure 8:
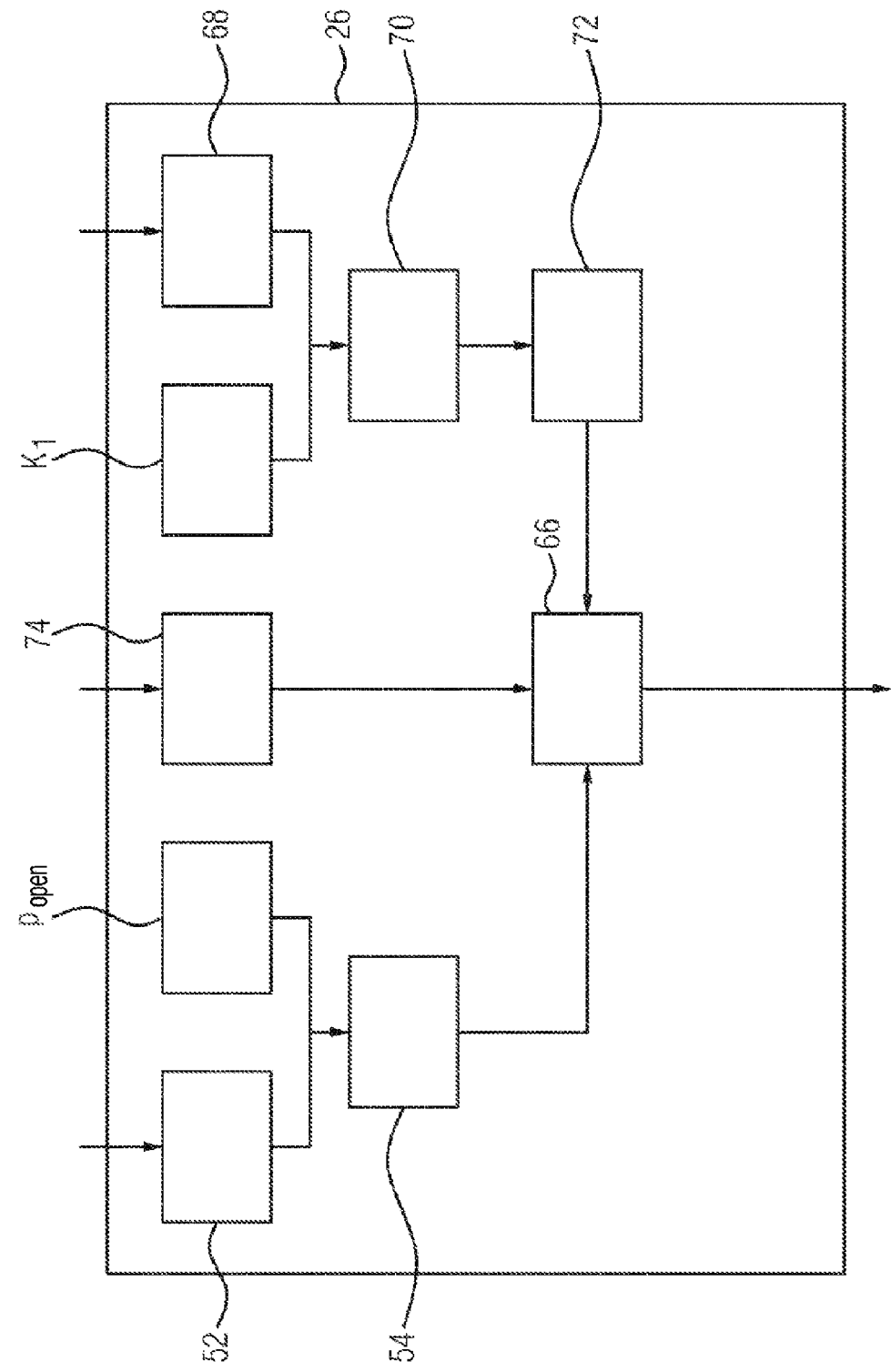
FIG. 8 shows a control device which is designed for carrying out the actuation method as per FIG. 7.

Below, with regard to FIG. 7 and FIG. 8, a third method will be described with which it is sought for an opening of the injector valves 42 to remain possible even in the fault situation of the fuel injection system 10. This method may be carried out in addition to the overrun deactivation and as an alternative to the adjustment of the camshaft 34. Here, too, the phenomenon is utilized whereby an injector valve 42 that seeks to open during a pressure peak 48 must open counter to a higher pressure than if it were to do so in a pressure valley 50. The difference between the pressure peak 48 and the pressure valley 50 is system-dependent, and may amount to for example 50 bar.

If the respective injector valve 42 opens in a pressure valley 50, the temperature and rotational speed range in which operation of the internal combustion engine is possible is expanded in relation to the injection during the pressure peak 48. Alternatively, a less expensive or more robust design of the pressure-limiting valve 46 may also be used, with the result of higher maximum pressures Pmax, and under some circumstances exhibit comparable exhibited operation of the internal combustion engine.

As already described, the pressure peak 48 in the high-pressure region 16 correlates with the top dead center TDC of the high-pressure fuel pump 14, where the propagation time of the fuel through the fuel injection system 10 proceeding from the outlet valve 36 must additionally be observed. Owing to the mechanical connection of the high-pressure fuel pump 14 to the internal combustion engine, the position of the top dead center TDC is known. As is also the case in the other methods, the fault situation is detected by detection of an undesirably high pressure in the high-pressure region 16 by the high-pressure sensor 44.

The start of injection of the injector valves 42 is stored in the control device 26 as a characteristic map.

As in the case of the method for the adjustment of the camshaft angle, the period duration tp between two TDC points of the pump piston 32 is determined, and the period duration TP is divided into four equally sized quadrants Q1 to Q4. Here, the injector valves 42 are actuated such that the opening time Topen of the injector valves 42 lies in an opening duration which extends into the second quadrant Q2 and into the third quadrant Q3. This means that the camshaft 34 is not adjusted, but rather the opening time Topen of the injector valves 42 is actively shifted. By shifting the opening time Topen into the pressure valley 50 specifically only after detection of the fault situation, the described advantages can be utilized. The shift of the opening time Topen during operation of the internal combustion engine is not relevant to emissions, because it is a fault situation.

Therefore, in the method, as in the case of the adjustment of the camshaft 34, the period duration tp is firstly determined, and it is then detected whether or not a fault situation is present.

In this case, too, the injector valves 42 are actuated only when a fuel demand from the internal combustion engine is actually present. If this is the case, the opening time Topen is shifted into the second quadrant Q2 or third quadrant Q3 of the period duration tp. However, if no fuel demand is present, no injection occurs.

After the shift of the opening time Topen, it is in turn checked whether the fuel injection system 10 remains in a fault situation, because it is optionally possible in this case too for the functionality to be withdrawn again if the fuel injection system 10 enters the normal mode again. In this case, the injection in the period duration tp occurs as desired in any of the four quadrants Q1 to Q4 directly in accordance with a fuel demand from the internal combustion engine.

Therefore, in the control device 26, a functionality is stored which, after the detection of a fault situation with an associated pressure increase in the high-pressure region 16, shifts the existing opening time Topen of the injector valves 42 for normal operation into a range which is more optimum for emergency running of the internal combustion engine. For this purpose, in the control device 26, a corresponding characteristic map may be stored, for example in the form of the opening time setting device 66, which shifts the opening time Topen of the injector valves 42 such that it lies in the pressure valley 50. The characteristic map may optionally be configured as a function of pressure and/or temperature and/or rotational speed of the internal combustion engine.

The shift of the opening time Topen may optionally be withdrawn again in a manner dependent on the pressure conditions in the system.

A number of implementations have been described. Nevertheless, it will be understood that various modifications may be made without departing from the spirit and scope of the disclosure. Accordingly, other implementations are within the scope of the following claims.

What is claimed is:

1. A control method for controlling at least one injector valve in a fuel injection system of an internal combustion engine, the method comprising:
    providing a fuel injection system including:
        a high-pressure fuel pump with a pump piston which is movable between a bottom dead center (BDC) and a top dead center (TDC) in a pressure chamber during operation and which serves for highly pressurizing a fuel, and
        a high-pressure region for storing the highly pressurized fuel and for supplying the highly pressurized fuel to the at least one injector valve;
    providing a pressure-limiting valve which, when a predefined opening pressure is reached in the high-pressure region, discharges fuel from the high-pressure region into the pressure chamber of the high-pressure fuel pump;
    detecting a fault situation in the fuel injection system, wherein the predefined opening pressure is overshot in the high-pressure region;
    detecting TDC times at which the pump piston is situated at the top dead center, and determining a period duration with four evenly distributed quadrants between a first TDC time and a second TDC time; and
    controlling the injector valve such that an opening time of the injector valve lies in an opening duration which extends in a second quadrant of the period duration and/or in a third quadrant of the period duration.

2. The control method of claim 1, wherein the fault situation is detected by a high-pressure sensor arranged in the high-pressure region.

3. The control method of claim 1, wherein the opening pressure of the pressure-limiting valve is set to be lower than a maximum admissible maximum pressure in the high-pressure region, the maximum pressure is defined in a range above 500 bar.

4. The control method of claim 1, wherein the injector valve is controlled so as to open only when a fuel demand from the internal combustion engine is present.

5. The control method of claim 1, wherein, upon a detection of re-entry into a normal mode of the fuel injection system in which the predefined opening pressure is undershot again in the high-pressure region, the injector valve is controlled such that the opening time of the injector valve lies in any one of the four evenly distributed quadrants.

6. The control method of claim 1, wherein, for the detection of the TDC times at which the pump piston is situated at the top dead center, a characteristic map is stored which assigns a predetermined crank angle of the internal combustion engine to the top dead center.

7. The control method of claim 1, wherein, for the detection of the TDC times at which the pump piston is situated at the top dead center, a crank angle of the internal combustion engine is acquired.

8. The control method of claim 1, wherein at least two operating states of the internal combustion engine are provided:
in an overrun mode, no injection of fuel through the injector valve into a combustion chamber takes place,
in an injection mode, at least one injection of fuel through the injector valve into the combustion chamber takes place, and
in the fault situation, the overrun mode of the internal combustion engine is deactivated, such that the internal combustion engine is operated exclusively in the injection mode.

9. The control method of claim 8, wherein a quantity of fuel is injected through the injector valve that a high pressure takes effect in the high-pressure region which is lower than the maximum pressure and which corresponds to an opening pressure of the pressure-limiting valve.

10. A fuel injection system for injecting fuel into combustion chambers of an internal combustion engine, the fuel injection system comprising:
a high-pressure fuel pump with a pump piston which moves between a bottom dead center and a top dead center in a pressure chamber during operation and which serves for highly pressurizing a fuel;
a high-pressure region for storing the highly pressurized fuel and for supplying the highly pressurized fuel to at least one injector valve arranged at the high-pressure region;
a pressure-limiting valve which is arranged in the high-pressure region and which is configured to, when a predefined opening pressure is reached in the high-pressure region, discharge a fuel from the high-pressure region into the pressure chamber of the high-pressure fuel pump; and
a control device configured to:
detect a fault situation in the fuel injection system, wherein the predefined opening pressure is overshot in the high-pressure region;
detect TDC times at which the pump piston is situated at the top dead center,
determine a period duration with four evenly distributed quadrants between a first TDC time and a second TDC time; and
control the injector valve such that an opening time of the injector valve lies in an opening duration which extends in a second quadrant of the period duration and/or in a third quadrant of the period duration.

11. The fuel injection system of claim 10, further comprising a high-pressure sensor arranged in the high-pressure region, the high-pressure sensor detects the fault situation.

12. The fuel injection system of claim 10, wherein the opening pressure of the pressure-limiting valve is set to be lower than a maximum admissible maximum pressure in the high-pressure region, the maximum pressure is defined in a range above 500 bar.

13. The fuel injection system of claim 10, wherein the injector valve is controlled so as to open only when a fuel demand from the internal combustion engine is present.

14. The fuel injection system of claim 10, wherein, upon a detection of re-entry into a normal mode of the fuel injection system in which the predefined opening pressure is undershot again in the high-pressure region, the injector valve is controlled such that the opening time of the injector valve lies in any one of the four evenly distributed quadrants.

15. The fuel injection system of claim 10, wherein, for the detection of the TDC times at which the pump piston is situated at the top dead center, the control device stores a characteristic map which assigns a predetermined crank angle of the internal combustion engine to the top dead center.

16. The fuel injection system of claim 10, wherein the control device further comprises a crank angle acquisition device for determining a crank angle of the internal combustion engine, wherein the control device detects the TDC times at which the pump piston is situated at the top dead center based on the crank angle.

17. The fuel injection system of claim 10, wherein the internal combustion engine includes at least two operating states:
in an overrun mode, no injection of fuel through the injector valve into a combustion chamber takes place,
in an injection mode, at least one injection of fuel through the injector valve into the combustion chamber takes place, and
in the fault situation, the overrun mode of the internal combustion engine is deactivated, such that the internal combustion engine is operated exclusively in the injection mode.

18. The fuel injection system of claim 17, wherein a quantity of fuel is injected through the injector valve that a high pressure takes effect in the high-pressure region which is lower than the maximum pressure and which corresponds to an opening pressure of the pressure-limiting valve.

* * * * *